United States Patent
Zheng et al.

(10) Patent No.: US 9,076,234 B2
(45) Date of Patent: Jul. 7, 2015

(54) SUPER-RESOLUTION METHOD AND APPARATUS FOR VIDEO IMAGE

(71) Applicant: Huawei Technologies Co., Ltd, Shenzhen (CN)

(72) Inventors: Chenglin Zheng, Shenzhen (CN); Hai Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 122 days.

(21) Appl. No.: 14/016,705

(22) Filed: Sep. 3, 2013

(65) Prior Publication Data

US 2014/0072232 A1    Mar. 13, 2014

(30) Foreign Application Priority Data

Sep. 7, 2012  (CN) .......................... 2012 1 0330199

(51) Int. Cl.
  *G06K 9/32*   (2006.01)
  *G06T 3/40*   (2006.01)
(52) U.S. Cl.
  CPC .................................. *G06T 3/4053* (2013.01)
(58) Field of Classification Search
  USPC .................................................. 382/299, 300
  See application file for complete search history.

(56) References Cited

U.S. PATENT DOCUMENTS

| | | | | |
|---|---|---|---|---|
| 5,760,921 A * | 6/1998 | Miyake | ......................... | 358/3.07 |
| 7,903,126 B2 * | 3/2011 | Yamada | ........................ | 345/671 |
| 7,907,788 B2 * | 3/2011 | Kawabe | ........................ | 382/266 |
| 8,233,744 B2 | 7/2012 | Tezuka | | |
| 8,279,341 B1 * | 10/2012 | Bozinovic | ..................... | 348/452 |
| 2005/0047680 A1 * | 3/2005 | Man | ............... | 382/299 |
| 2008/0019613 A1 * | 1/2008 | Tanaka | ........................ | 382/302 |
| 2009/0110285 A1 * | 4/2009 | Elad et al. | ..................... | 382/190 |
| 2010/0027664 A1 * | 2/2010 | Sato | ......................... | 375/240.16 |
| 2013/0121568 A1 * | 5/2013 | Krishnan et al. | .............. | 382/162 |
| 2013/0308877 A1 * | 11/2013 | Tezuka | .......................... | 382/300 |

FOREIGN PATENT DOCUMENTS

| | | |
|---|---|---|
| CN | 101247489 A | 8/2008 |
| CN | 102150418 A | 8/2011 |
| WO | 2010105408 A1 | 9/2010 |

OTHER PUBLICATIONS

Protter, M. et al., "Generalizing the Nonlocal-Means to Super-Resolution Reconstruction," IEEE Transactions on Image Processing, vol. 18, No. 1, Jan. 2009, 17 pages.

* cited by examiner

*Primary Examiner* — John Strege
(74) *Attorney, Agent, or Firm* — Slater & Matsil, L.L.P.

(57) ABSTRACT

A super-resolution method and apparatus for a video image are disclosed. The method includes performing super-resolution processing based on fuzzy motion estimation by integral multiple times on an original low-resolution video image, to obtain an intermediate high-resolution video image. When resolution of the intermediate high-resolution video image is different from resolution of a target high-resolution video image, a non-integral multiple between the resolution of the target high-resolution video image and the resolution of the intermediate high-resolution video image is calculated. Super-resolution processing based on interpolation by the non-integral is performed multiple times on the intermediate high-resolution video image, to obtain the target high-resolution video image.

20 Claims, 4 Drawing Sheets

FIG. 6

SUPER-RESOLUTION METHOD AND APPARATUS FOR VIDEO IMAGE

CROSS-REFERENCE TO RELATED APPLICATIONS

This application claims priority to Chinese Patent Application No. 201210330199.5, filed on Sep. 7, 2012, which is hereby incorporated by reference in entirety.

TECHNICAL FIELD

The present invention relates to the field of a video image, and in particular, to a super-resolution method, and apparatus for a video image.

BACKGROUND

Super-resolution of a video image refers to a technology of obtaining a high-resolution video image through corresponding processing by using a low-resolution video image. The super-resolution technology is widely applied in many scenarios and has important application values and market prospects in fields such as high-definition TV, mobile communication, image and video compression technologies, social security, video surveillance, graphic rendering, image inpainting, biometric authentication, and satellite and astronomical images. Therefore, a method for implementing super-resolution on a video image is especially important.

At present, super-resolution methods for a video image mainly include: a super-resolution method based on interpolation, where in the method, generally, known points in a low-resolution video image are used to interpolate an unknown point in a high-resolution video image by using a specific function relationship, so that the high-resolution video image is obtained; and a super-resolution method based on fuzzy motion estimation, where the method uses a large amount of redundant information existing in an image either in space or in time to find many similar blocks in a current frame and a frame adjacent to the current frame, assigns a weight to each similar block according to a difference, and then performs a multiply-accumulate operation on points in the low-resolution video image to which these similar blocks are mapped and the assigned weights, so as to obtain new values of points in the high-resolution video image.

During the implementation of the present invention, it is found that the prior art has at least the following problems.

The super-resolution method based on interpolation is based merely on image pixel values, where a problem of blurring and jagged edges may easily occur when a magnification is large (greater than 2), and an effect of super-resolution sharpening can hardly be achieved. In the super-resolution method based on fuzzy motion estimation, when weighted accumulation is performed on points in a low-resolution video image to which similar blocks are mapped and weights, a coordinate mapping relationship between a point in a high-resolution video image and a point in the low-resolution video image needs to be used, where for super-resolution by non-integral multiple times, a point in the low-resolution video image cannot be accurately mapped to the high-resolution video image.

SUMMARY

In order to solve the problems of the prior art, embodiments of the present invention provide a super-resolution method and apparatus for a video image. The technical solutions are as follows:

In one aspect, a super-resolution method for a video image is provided, where the method includes:

performing super-resolution processing based on fuzzy motion estimation by integral multiple times on an original low-resolution video image, to obtain an intermediate high-resolution video image, where the integral multiple times is an integral multiple between resolution of a target high-resolution video image and resolution of the original low-resolution video image;

when resolution of the intermediate high-resolution video image is different from the resolution of the target high-resolution video image, calculating a non-integral multiple between the resolution of the target high-resolution video image and the resolution of the intermediate high-resolution video image; and performing super-resolution processing based on interpolation by the non-integral multiple times on the intermediate high-resolution video image, to obtain the target high-resolution video image.

Specifically, after obtaining the intermediate high-resolution video image, the method further includes:

determining whether the resolution of the intermediate high-resolution video image is the same as the resolution of the target high-resolution video image; and when the resolution of the intermediate high-resolution video image is the same as the resolution of the target high-resolution video image, using the intermediate high-resolution video image as the target high-resolution video image.

Specifically, after obtaining the target high-resolution video image, the method further includes:

extracting a high-resolution video image of edge information; and adding the high-resolution video image of the edge information, after performing gain control thereon, to the target high-resolution video image, to obtain an enhanced target high-resolution video image.

Specifically, after using the intermediate high-resolution video image as the target high-resolution video image, the method further includes:

extracting a high-resolution video image of edge information; and adding the high-resolution video image of the edge information, after performing gain control thereon, to the intermediate high-resolution video image, to obtain an enhanced target high-resolution video image.

Further, the extracting the high-resolution video image of the edge information specifically includes:

extracting the edge information of the original low-resolution video image; and magnifying the edge information to obtain the high-resolution video image of the edge information.

In another aspect, a super-resolution apparatus for a video image is provided, where the apparatus includes:

a first processing module, configured to perform super-resolution processing based on fuzzy motion estimation by integral multiple times on an original low-resolution video image, to obtain an intermediate high-resolution video image, where the integral multiple times is an integral multiple between resolution of a target high-resolution video image and resolution of the original low-resolution video image;

a calculating module, configured to, when resolution of the intermediate high-resolution video image is different from the resolution of the target high-resolution video image, calculate a non-integral multiple between the resolution of the target high-resolution video image and the resolution of the intermediate high-resolution video image; and a second processing module, configured to perform super-resolution processing based on interpolation by the non-integral multiple times on the intermediate high-resolution video image, to obtain the target high-resolution video image.

Specifically, the apparatus further includes:

a judging module, configured to determine whether the resolution of the intermediate high-resolution video image is the same as the resolution of the target high-resolution video image; and a determining module, configured to, when the judging module determines that the resolution of the intermediate high-resolution video image is the same as the resolution of the target high-resolution video image, use the intermediate high-resolution video image as the target high-resolution video image.

Specifically, the apparatus further includes:

an extracting module, configured to extract a high-resolution video image of edge information; and a first enhancing module, configured to add the high-resolution video image of the edge information extracted by the extracting module, after performing gain control thereon, to the target high-resolution video image, to obtain an enhanced target high-resolution video image.

Specifically, the apparatus further includes:

an extracting module, configured to extract a high-resolution video image of edge information; and a second enhancing module, configured to add the high-resolution video image of the edge information extracted by the extracting module, after performing gain control thereon, to the intermediate high-resolution video image, to obtain an enhanced target high-resolution video image.

Further, the extracting module is specifically configured to extract the edge information of the original low-resolution video image, and magnify the edge information to obtain the high-resolution video image of the edge information.

The technical solutions provided by the embodiments of the present invention produce the following benefits:

By performing super-resolution processing based on fuzzy motion estimation by integral multiple times on an original low-resolution video image first, and then performing super-resolution processing based on interpolation by non-integral multiple times, a target high-resolution video image is obtained, which solves the problem that a common super-resolution method based on fuzzy motion estimation cannot produce a good effect for super-resolution processing by non-integral multiple times, and solves the problem of a super-resolution method based on interpolation that blurring and jagged edges may easily occur.

BRIEF DESCRIPTION OF DRAWINGS

To describe the technical solutions in the embodiments of the present invention more clearly, the following briefly introduces the accompanying drawing required for describing the embodiments of the present invention. Apparently, the accompanying drawing in the following description show merely some embodiments of the present invention, and persons of ordinary skill in the art may still derive other drawings from the accompanying drawing without creative efforts.

DESCRIPTION OF EMBODIMENTS

To make the objectives, technical solutions, and advantages of the present invention clearer, embodiments of the present invention are further described in detail with reference to accompanying drawings.

Embodiment 1

Figure 1:
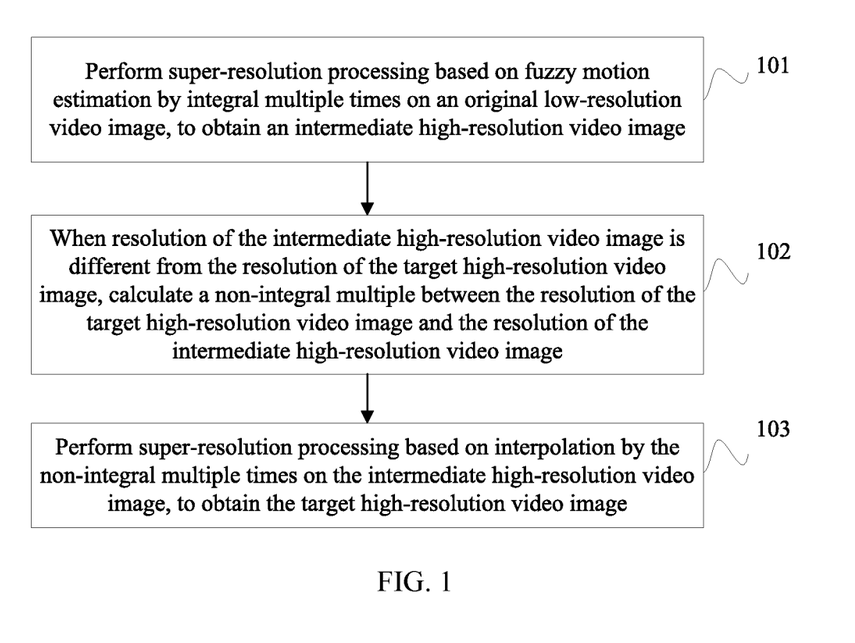
FIG. 1 is a flowchart of a super-resolution method for a video image according to Embodiment 1 of the present invention.

The embodiment of the present invention provides a super-resolution method for a video image. As shown in FIG. 1, the method includes:

101. Perform super-resolution processing based on fuzzy motion estimation by integral multiple times on an original low-resolution video image, to obtain an intermediate high-resolution video image, where the integral multiple times is an integral multiple between resolution of a target high-resolution video image and resolution of the original low-resolution video image.

102. When resolution of the intermediate high-resolution video image is different from the resolution of the target high-resolution video image, calculate a non-integral multiple between the resolution of the target high-resolution video image and the resolution of the intermediate high-resolution video image.

103. Perform super-resolution processing based on interpolation by the non-integral multiple times on the intermediate high-resolution video image, to obtain the target high-resolution video image.

Specifically, after obtaining the intermediate high-resolution video image, the method further includes:

determining whether the resolution of the intermediate high-resolution video image is the same as the resolution of the target high-resolution video image; and when the resolution of the intermediate high-resolution video image is the same as the resolution of the target high-resolution video image, using the intermediate high-resolution video image as the target high-resolution video image.

Specifically, after obtaining the target high-resolution video image, the method further includes:

extracting a high-resolution video image of edge information; and adding the high-resolution video image of the edge information, after performing gain control thereon, to the target high-resolution video image, to obtain an enhanced target high-resolution video image.

Specifically, after using the intermediate high-resolution video image as the target high-resolution video image, the method further includes:

extracting a high-resolution video image of edge information; and adding the high-resolution video image of the edge information, after performing gain control thereon, to the intermediate high-resolution video image, to obtain an enhanced target high-resolution video image.

Further, extracting the high-resolution video image of the edge information specifically includes:

extracting the edge information of the original low-resolution video image; and magnifying the edge information to obtain the high-resolution video image of the edge information.

As described above, in the embodiment of the present invention, by performing super-resolution processing based on fuzzy motion estimation by integral multiple times on an original low-resolution video image first, and then performing super-resolution processing based on interpolation by non-integral multiple times, a target high-resolution video image is obtained, which solves the problem that a common super-resolution method based on fuzzy motion estimation cannot produce a good effect for super-resolution processing by non-integral multiple times, and solves the problem of a super-resolution method based on interpolation that blurring and jagged edges may easily occur.

Embodiment 2

Figure 2:
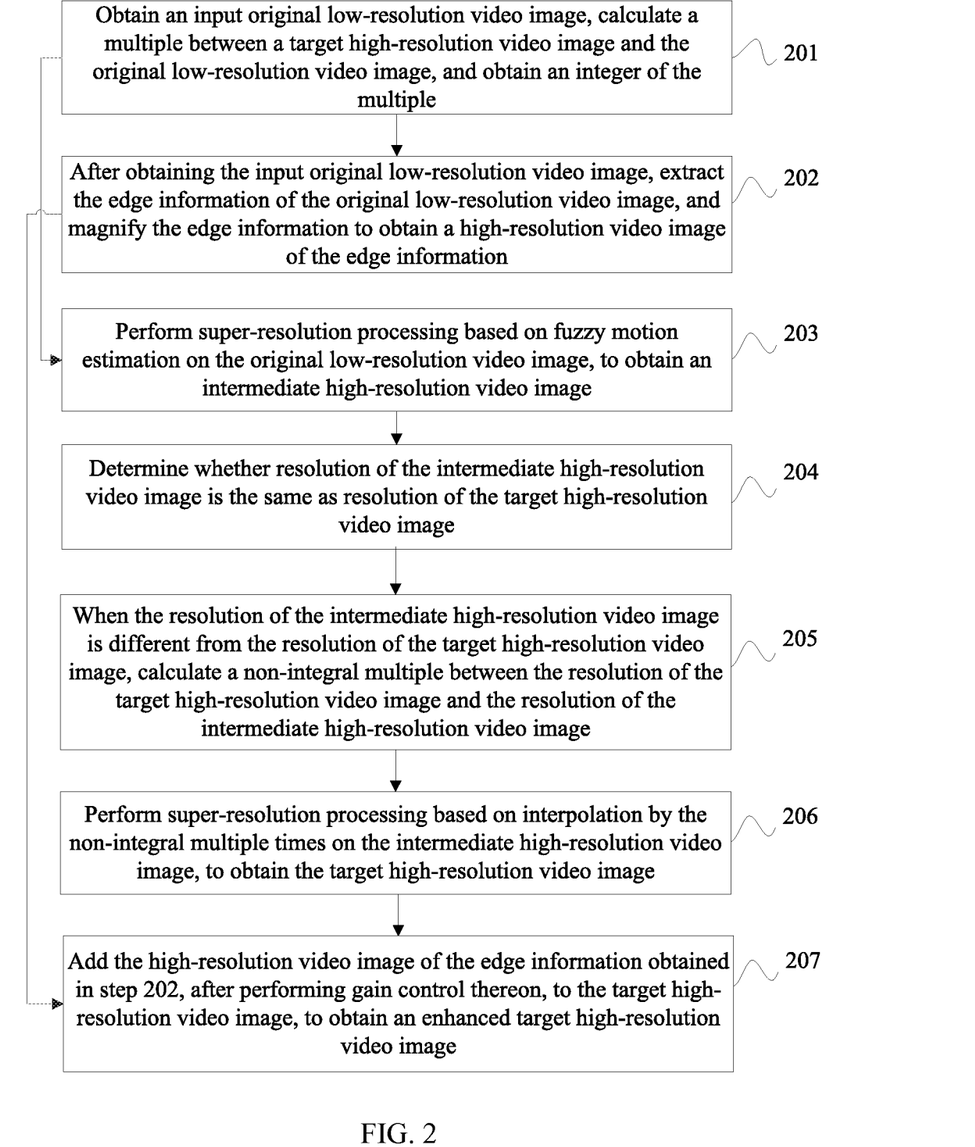
FIG. 2 is a flowchart of a super-resolution method for a video image according to Embodiment 2 of the present invention.

The embodiment of the present invention provides a super-resolution method for a video image. As shown in FIG. 2, the method includes the following.

201. Obtain an input original low-resolution video image, calculate a multiple between a target high-resolution video image and the original low-resolution video image, and obtain an integer of the multiple.

Specifically, the multiple between the target high-resolution video image and the original low-resolution video image is determined as follows: Magnifications of a width and a height are both magnifications of a width and a height required for magnifying the original low-resolution video image to the target high-resolution video image, and integers of the magnifications of the width and the height are both integral parts of the magnifications of the width and the height required for magnifying the original low-resolution video image to the target high-resolution video image. For example, to perform super-resolution on a standard-definition video format (720×480) to obtain a high-definition video format (1920×1080), because 1920/702=2.67, and 1080/480=2.25, magnifications of a width and a height are 2.67 and 2.25, respectively, and integers of the magnifications of the width and the height are 2 and 2, respectively.

202. After obtaining the input original low-resolution video image, extract the edge information of the original low-resolution video image, and magnify the edge information to obtain a high-resolution video image of the edge information.

Specifically, a LoG(Laplacian of the Gaussian) operator may be used to extract the edge information; the extracted edge information of the original low-resolution video image may be magnified by using a method of bicubic interpolation and polyphase interpolation, or by using any other magnification method, as long as resolution of the high-resolution video image of the edge information is the same as that of the target high-resolution video image.

It should be noted that because this step is performed after the input original low-resolution video image is obtained, and this step is a step performed separately, this step may be performed before the multiple between the target high-resolution video image and the original low-resolution video image is calculated in step 201, or may be performed after any step before step 207. The embodiment of the present invention is not limited thereto.

203. Perform super-resolution processing based on fuzzy motion estimation on the original low-resolution video image, to obtain an intermediate high-resolution video image, where resolution of the intermediate high-resolution video image is an integral multiple of resolution of the original low-resolution video image, and the integral multiple is an integer of a multiple between the resolution of the target high-resolution video image and the resolution of the original low-resolution video image.

Specifically, for a reference block in a current frame image at a certain moment, many image blocks similar to the reference block may be found in the current frame and a frame adjacent to the current frame; after these similar frames are found, a weight is assigned to each similar block according to its respective similarity to the reference block; then, the current reference block is replaced by using these similar blocks weighted with the weights. The fuzzy motion estimation is equivalent to allowing all found similar blocks to get involved in the calculation, while exact motion estimation is directed to find a most accurate block.

Specifically, firstly, the input original low-resolution video image is magnified by integral multiple times by common interpolation, to obtain an initial high-resolution video image; then, in the initial high-resolution video image and with respect to a current target point, a target area is selected (normally a rectangular area is selected) and a search area is defined, and then at least one comparison area is selected in the search area; next, the target area is compared with the comparison area, to obtain a difference (which may also be an Euclidean distance) between the target area and the comparison area, and a weight is assigned to each comparison area according to the obtained difference depending on a specific relationship; and finally, a weight of each comparison area and a point in the original low-resolution video image to which the comparison area is mapped are multiplied, accumulated, and normalized, to obtain a new value of the current point in the intermediate high-resolution video image.

In the embodiment of the present invention, a super-resolution method based on NLM (Non-local Means, non-local means) in fuzzy motion estimation may be specifically used to perform the super-resolution processing based on fuzzy motion estimation by integral multiple times on the original low-resolution video image.

The principle of NLM is on a basis that a large amount of redundancy exists in an image. That is, for the content of an image, there may be many same and similar contents in an adjacent area. Therefore, the NLM method arranges a weight to a point in an adjacent area according to the similarity between the point in the adjacent area and a current point to be processed, and then calculates a weighted average of these points to replace a value of the current point to be processed, where its math expression is shown in the following equation:

$$\hat{X}[k, l] = \frac{\sum_{(i,j) \in N(k,l)} w[k, l, i, j] y[i, j]}{\sum_{(i,j) \in N(k,l)} w[k, l, i, j]}$$

where, N(k, l) represents an adjacent area of a current pixel point (k, l), w[k, l, i, j] is a weight of a pixel point (i, j) in the adjacent area relative to the current pixel point (k, l), an input pixel point is y[i,j], and an output pixel is X[k, l].

The weight w is calculated by assigning a weight based on an Euclidean distance (Euclidean distance) between two blocks, where a specific method is shown in the following equation:

$$w[k, l, i, j] = \exp\left\{-\frac{\|\hat{R}_{k,l}y - \hat{R}_{i,j}y\|_2^2}{2\delta^2}\right\}$$

where, $\hat{R}_{k,l}$ y represents an image block by using a pixel point [k, l] as a center in an input image, $\hat{R}_{i,j}$ y represents an image block by using a point [i, j] in an area adjacent to the point [k, l] in the input image as a center, $\|\hat{R}_{k,l}y - \hat{R}_{i,j}y\|_2^2$ represents an Euclidean distance between the two blocks, and δ is a control parameter.

The super-resolution method based on NLM uses the Euclidean distance between the two blocks in the above equation when calculating a difference.

204. Determine whether the resolution of the intermediate high-resolution video image is the same as the resolution of the target high-resolution video image.

Specifically, whether the resolution of the video image obtained in step 203 is the same as the resolution of the target high-resolution video image is determined. For example, to perform super-resolution on a standard-definition video format (720×480) to obtain a high-definition video format (1920×1080), the integral multiples in step 203 are 2 and 2, respectively, to obtain an image size being 1440×960 which is different from the size 1920×1080 of the target high-resolution video image; therefore, step 205 needs to be executed.

When the resolution of the intermediate high-resolution video image and the resolution of the target high-resolution video image are the same, the intermediate high-resolution video image is used as the target high-resolution video image. If in the above example, the size of the target high-resolution video image that needs to be finally obtained is 1440×906, the resolution of the video image obtained in step 203 is the same as the resolution of the target high-resolution video image, and it is unnecessary to execute step 205.

205. When the resolution of the intermediate high-resolution video image is different from the resolution of the target high-resolution video image, calculate a non-integral multiple between the resolution of the target high-resolution video image and the resolution of the intermediate high-resolution video image.

Specifically, when the resolution of the target high-resolution video image is different from the resolution of the intermediate high-resolution video image, a non-integral multiple between the target high-resolution video image and the intermediate high-resolution video image obtained in step 203 is calculated. In this case, a magnification is smaller than 2. For example, to perform super-resolution on a standard-definition video format (720×480) to obtain a high-definition video format (1920×1080), because the original low-resolution image (720×480) has been magnified by 2 times in step 203, a 1440×960 intermediate high-resolution video image is obtained; then the 1440×960 intermediate high-resolution video image is magnified to a 1920×1080 target high-resolution video image. In this case, the magnifications from 1440×960 to 1920×1080 are 1920/1440=1.33 in width, and 1080/960=1.125 in height, respectively.

206. Perform super-resolution processing based on interpolation by the non-integral multiple times on the intermediate high-resolution video image, to obtain the target high-resolution video image.

Specifically, the super-resolution method based on interpolation is a most intuitive method in the current super-resolution study. This method generally uses known points in a low-resolution video image to perform interpolation to obtain an unknown point in a high-resolution video image by using a specific function relationship. A general math expression of image interpolation is shown in the following equation, where g(i, j) is a pixel value to be obtained by interpolation in a scaled image, f(k, l) is a pixel value at coordinates (k, l) in an original image, and h(i-k, j-l) is an interpolation primary function:

$$g(i, j) = \sum_k \sum_l f(k, l)h(i - k, j - l)$$

The interpolation primary function may be one of various types of functions, which normally include a two-dimensional rectangular function, a linear function, a cubic function, and a sinc function which correspond to nearest interpolation, linear interpolation, cubic (cubic) interpolation, and ideal interpolation (which actually uses a truncation function of sinc), respectively. In actual processing, normally a filter is used to perform interpolation. For a two-dimensional image, because these interpolation functions have symmetrical characteristics and common rows and columns of a two-dimensional image may be separated, generally interpolation may be implemented in horizontal and vertical directions by the means of bi-linear interpolation, bi-cubic interpolation, polyphase interpolation, and the like. With respect to the super-resolution technology based on interpolation, after an interpolation algorithm, generally an image recovery technology is required to eliminate blurring and reduce noise.

In the embodiment of the present invention, the interpolation algorithm may use the methods of bi-cubic interpolation and polyphase interpolation. These two interpolation methods produce good effects when the magnification is small than 2.

207. Add the high-resolution video image of the edge information obtained in step 202, after performing gain control thereon, to the target high-resolution video image, to obtain an enhanced target high-resolution video image.

Specifically, the gain control is performed on the high-resolution video image of the edge information obtained in step 202. Because different users or different apparatuss have different requirements for edge sharpening effects on a high-resolution video image, the gain control needs to be performed according to actual requirements.

The high-resolution video image of the edge information after the gain control is added to the target high-resolution video image, to obtain the enhanced target high-resolution video image. Herein, the target high-resolution video image may be the target high-resolution video image obtained in step 206, or may be the intermediate high-resolution video image when it is determined that the resolution of the intermediate high-resolution video image is the same as the resolution of the target high-resolution video image in step 204.

As described above, in the embodiment of the present invention, by performing super-resolution processing based on fuzzy motion estimation by integral multiple times on an original low-resolution video image first, and then performing super-resolution processing based on interpolation by non-integral multiple times, a target high-resolution video image is obtained, which solves the problem that a common super-resolution method based on fuzzy motion estimation cannot produce a good effect for super-resolution processing by non-integral multiple times, and solves the problem of a super-resolution method based on interpolation that blurring and jagged edges may easily occur.

Embodiment 3

Figure 3:
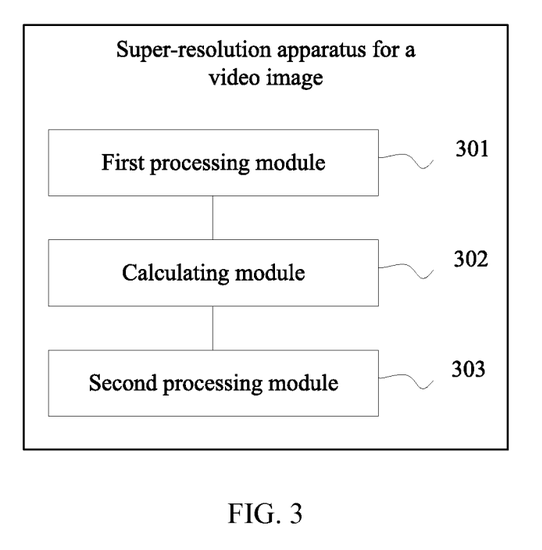
FIG. 3 is a schematic structural diagram of a super-resolution apparatus for a video image according to Embodiment 3 of the present invention.

As shown in FIG. 3, the embodiment of the present invention provides a super-resolution apparatus for a video image, where the apparatus includes:

a first processing module 301, configured to perform super-resolution processing based on fuzzy motion estimation by integral multiple times on an original low-resolution video image, to obtain an intermediate high-resolution video image, where the integral multiple times is an integral multiple between resolution of a target high-resolution video image and resolution of the original low-resolution video image;

a calculating module 302, configured to, when resolution of the intermediate high-resolution video image is different from the resolution of the target high-resolution video image, calculate a non-integral multiple between the resolution of the target high-resolution video image and the resolution of the intermediate high-resolution video image; and a second processing module 303, configured to perform super-resolution processing based on interpolation by the non-integral multiple times on the intermediate high-resolution video image, to obtain the target high-resolution video image.

Figure 4:
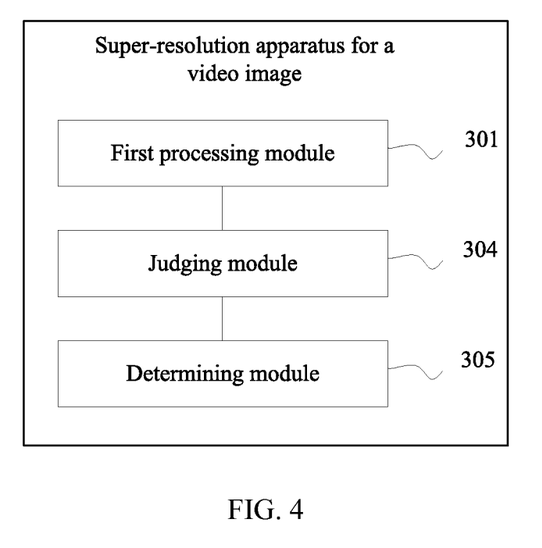
FIG. 4 is another schematic structural diagram of a super-resolution apparatus for a video image according to Embodiment 3 of the present invention.

Specifically, as shown in FIG. 4, the apparatus further includes:

a judging module 304, configured to determine whether the resolution of the intermediate high-resolution video image is the same as the resolution of the target high-resolution video image; and a determining module 305, configured to, when the judging module 304 determines that the resolution of the intermediate high-resolution video image is the same as the resolution of the target high-resolution video image, use the intermediate high-resolution video image as the target high-resolution video image.

Figure 5:
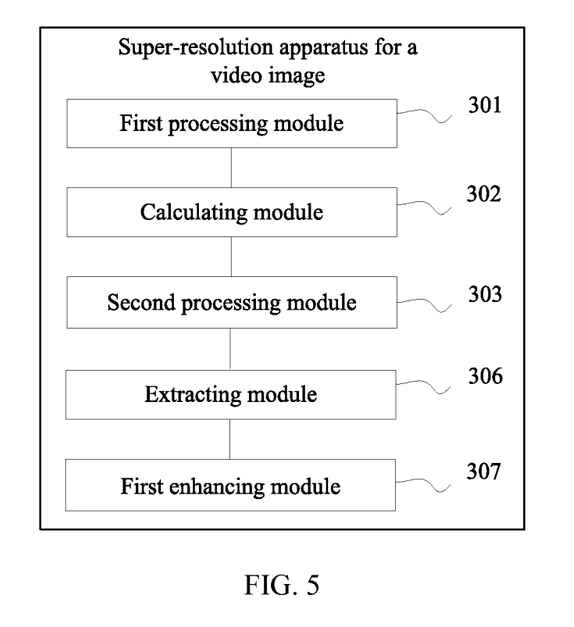
FIG. 5 is a third schematic structural diagram of a super-resolution apparatus for a video image according to Embodiment 3 of the present invention.

Specifically, as shown in FIG. 5, the apparatus further includes:

an extracting module 306, configured to extract a high-resolution video image of edge information; and a first enhancing module 307, configured to add the high-resolution video image of the edge information extracted by the extracting module 306, after performing gain control thereon, to the target high-resolution video image, to obtain an enhanced target high-resolution video image.

Figure 6:
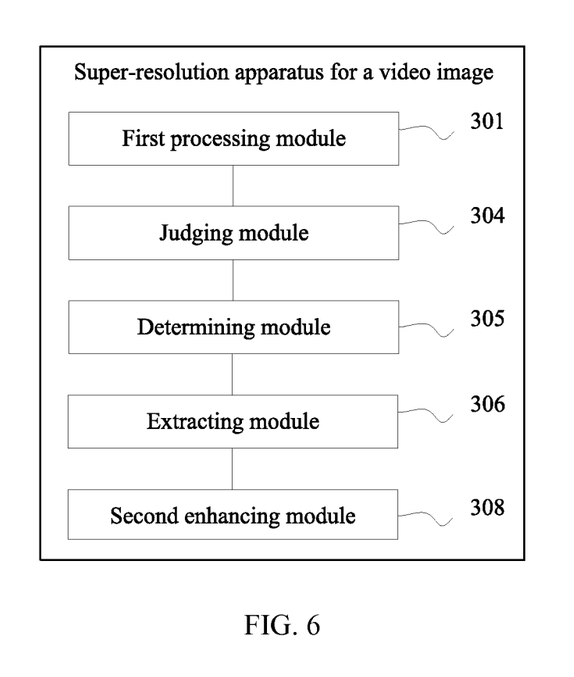
FIG. 6 is a fourth schematic structural diagram of a super-resolution apparatus for a video image according to Embodiment 3 of the present invention.

Specifically, as shown in FIG. 6, the apparatus further includes:

an extracting module 306, configured to extract a high-resolution video image of edge information; and a second enhancing module 308, configured to add the high-resolution video image of the edge information extracted by the extracting module 306, after performing gain control thereon, to the intermediate high-resolution video image, to obtain an enhanced target high-resolution video image.

Further, the extracting module 306 is specifically configured to extract the edge information of the original low-resolution video image, and magnify the edge information, to obtain the high-resolution video image of the edge information.

As described above, in the embodiment of the present invention, by performing super-resolution processing based on fuzzy motion estimation by integral multiple times on an original low-resolution video image first, and then performing super-resolution processing based on interpolation by non-integral multiple times, a target high-resolution video image is obtained, which solves the problem that a common super-resolution method based on fuzzy motion estimation cannot produce a good effect for super-resolution processing by non-integral multiple times, and solves the problem of a super-resolution method based on interpolation that blurring and jagged edges may easily occur.

Embodiment 4

The embodiment of the present invention provides a super-resolution apparatus for a video image, where the apparatus includes:

a processor, configured to perform super-resolution processing based on fuzzy motion estimation by integral multiple times on an original low-resolution video image, to obtain an intermediate high-resolution video image, where the integral multiple times is an integral multiple between resolution of a target high-resolution video image and resolution of the original low-resolution video image; when resolution of the intermediate high-resolution video image is different from the resolution of the target high-resolution video image, calculate a non-integral multiple between the resolution of the target high-resolution video image and the resolution of the intermediate high-resolution video image; and perform super-resolution processing based on interpolation by the non-integral multiple times on the intermediate high-resolution video image, to obtain the target high-resolution video image.

Specifically, the processor is further configured to, after obtaining the intermediate high-resolution video image, determine whether the resolution of the intermediate high-resolution video image is the same as the resolution of the target high-resolution video image; and when the resolution of the intermediate high-resolution video image is the same as the resolution of the target high-resolution video image, use the intermediate high-resolution video image as the target high-resolution video image.

Specifically, the processor is further configured to, after obtaining the target high-resolution video image, extract a high-resolution video image of edge information; and add the high-resolution video image of the edge information, after performing gain control thereon, to the target high-resolution video image, to obtain an enhanced target high-resolution video image.

Specifically, the processor is further configured to, after using the intermediate high-resolution video image as the target high-resolution video image, extract a high-resolution video image of edge information; and add the high-resolution video image of the edge information, after performing gain control thereon, to the intermediate high-resolution video image, to obtain an enhanced target high-resolution video image.

Further, the processor is specifically configured to extract the edge information of the original low-resolution video image, and magnify the edge information, to obtain the high-resolution video image of the edge information.

As described above, in the embodiment of the present invention, by performing super-resolution processing based on fuzzy motion estimation by integral multiple times on an original low-resolution video image first, and then performing super-resolution processing based on interpolation by non-integral multiple times, a target high-resolution video image is obtained, which solves the problem that a common super-resolution method based on fuzzy motion estimation cannot produce a good effect for super-resolution processing by non-integral multiple times, and solves the problem of a super-resolution method based on interpolation that blurring and jagged edges may easily occur.

It should be noted that, when the super-resolution apparatus for a video image according to the above embodiments are performing super-resolution processing on a video image, the division of the functional modules is used merely as an example for description. In an actual application, the functions may be assigned to different functional modules for completion according to requirements. That is, internal structures of the apparatus are divided into different functional modules for completing all or a part of functions described above. In addition, the super-resolution apparatus for a video image according to the above embodiments belong to the same conception as the super-resolution method embodiment. Reference may be made to the method embodiment for specific implementation thereof, and details are not repeated herein.

The sequence numbers of the above embodiments of the present invention are used merely for description, and do not represent preference of the embodiments.

Persons of ordinary skill in the art may understand that all or part of the steps in the embodiments may be implemented by hardware, or by a program instructing relevant hardware. The program may be stored in a computer readable storage medium, and the storage medium may be a read-only memory, a CD-ROM, a magnetic disk, or the like.

The above description is merely about preferred embodiments of the present invention and is not intended to restrict the present invention. Any modifications, equivalent replacements, and improvements made without departing from the idea and principle of the present invention shall fall within the protection scope of the present invention.

What is claimed is:

1. A super-resolution method for a video image, the method comprising:
   performing super-resolution processing based on fuzzy motion estimation by integral multiple times on an original low-resolution video image, to obtain an intermediate high-resolution video image, wherein the integral multiple times is an integral multiple between a resolution of a target high-resolution video image and a resolution of the original low-resolution video image;
   when a resolution of the intermediate high-resolution video image is different from the resolution of the target high-resolution video image, calculating a non-integral multiple between the resolution of the target high-resolution video image and the resolution of the intermediate high-resolution video image; and
   performing super-resolution processing based on interpolation by the non-integral multiple times on the intermediate high-resolution video image, to obtain the target high-resolution video image.

2. The method according to claim 1, wherein, after obtaining the intermediate high-resolution video image, the method further comprises:
   determining whether the resolution of the intermediate high-resolution video image is the same as the resolution of the target high-resolution video image; and
   when the resolution of the intermediate high-resolution video image is the same as the resolution of the target high-resolution video image, using the intermediate high-resolution video image as the target high-resolution video image.

3. The method according to claim 2, wherein after using the intermediate high-resolution video image as the target high-resolution video image, the method further comprises:
   extracting a high-resolution video image of edge information; and
   adding the high-resolution video image of the edge information, after performing gain control thereon, to the intermediate high-resolution video image, to obtain an enhanced target high-resolution video image.

4. The method according to claim 3, wherein extracting the high-resolution video image of the edge information specifically comprises:
   extracting the edge information of the original low-resolution video image; and
   magnifying the edge information to obtain the high-resolution video image of the edge information.

5. The method according to claim 1, wherein, after obtaining the target high-resolution video image, the method further comprises:
   extracting a high-resolution video image of edge information; and
   adding the high-resolution video image of the edge information, after performing gain control thereon, to the target high-resolution video image, to obtain an enhanced target high-resolution video image.

6. The method according to claim 5, wherein extracting the high-resolution video image of the edge information specifically comprises:
   extracting the edge information of the original low-resolution video image; and
   magnifying the edge information to obtain the high-resolution video image of the edge information.

7. The method according to claim 1, wherein the resolution of the intermediate high-resolution video image is the same as the resolution of the target high-resolution video image and wherein after the obtaining the intermediate high-resolution video image, the method further comprises using the intermediate high-resolution video image as the target high-resolution video image.

8. The method according to claim 7, wherein, after using the intermediate high-resolution video image as the target high-resolution video image, the method further comprises:
   extracting a high-resolution video image of edge information; and
   performing gain control on the high-resolution video image of edge information.

9. The method according to claim 8, wherein, after performing the gain control, the method further comprises:
   adding the high-resolution video image of the edge information to the intermediate high-resolution video image, to obtain an enhanced target high-resolution video image.

10. The method according to claim 9, wherein extracting the high-resolution video image of the edge information specifically comprises:
    extracting the edge information of the original low-resolution video image; and
    magnifying the edge information to obtain the high-resolution video image of the edge information.

11. The method according to claim 8, wherein extracting the high-resolution video image of the edge information specifically comprises:
    extracting the edge information of the original low-resolution video image; and
    magnifying the edge information to obtain the high-resolution video image of the edge information.

12. A video image processing apparatus comprising a computer including a non-transitory computer-readable medium storing program modules executable by the computer, the modules including:
    a first processing module, configured to perform super-resolution processing based on fuzzy motion estimation by integral multiple times on an original low-resolution video image, to obtain an intermediate high-resolution video image, wherein the integral multiple times is an integral multiple between resolution of a target high-resolution video image and resolution of the original low-resolution video image;

a calculating module, configured to, when resolution of the intermediate high-resolution video image is different from the resolution of the target high-resolution video image, calculate a non-integral multiple between the resolution of the target high-resolution video image and the resolution of the intermediate high-resolution video image; and a second processing module, configured to perform super-resolution processing based on interpolation by the non-integral multiple times on the intermediate high-resolution video image, to obtain the target high-resolution video image.

13. The apparatus according to claim 12, wherein the apparatus further comprises:

a judging module, configured to determine whether the resolution of the intermediate high-resolution video image is the same as the resolution of the target high-resolution video image; and a determining module, configured to, when the judging module determines that the resolution of the intermediate high-resolution video image is the same as the resolution of the target high-resolution video image, use the intermediate high-resolution video image as the target high-resolution video image.

14. The apparatus according to claim 13, wherein the apparatus further comprises:

an extracting module, configured to extract a high-resolution video image of edge information; and a second enhancing module, configured to add the high-resolution video image of the edge information extracted by the extracting module, after performing gain control thereon, to the intermediate high-resolution video image, to obtain an enhanced target high-resolution video image.

15. The apparatus according to claim 14, wherein the extracting module is configured to extract the edge information of the original low-resolution video image and to magnify the edge information, to obtain the high-resolution video image of the edge information.

16. The apparatus according to claim 12, further comprising:

an extracting module, configured to extract a high-resolution video image of edge information; and a first enhancing module, configured to add the high-resolution video image of the edge information extracted by the extracting module, after performing gain control thereon, to the target high-resolution video image, to obtain an enhanced target high-resolution video image.

17. The apparatus according to claim 16, wherein the extracting module is configured to extract the edge information of the original low-resolution video image and to magnify the edge information, to obtain the high-resolution video image of the edge information.

18. An apparatus comprising:

a processor coupled to a memory;

wherein the processor is programmed to process a video image by:

performing super-resolution processing based on fuzzy motion estimation by integral multiple times on an original low-resolution video image, to obtain an intermediate high-resolution video image, wherein the integral multiple times is an integral multiple between a resolution of a target high-resolution video image and a resolution of the original low-resolution video image;

when resolution of the intermediate high-resolution video image is different from the resolution of the target high-resolution video image, calculating a non-integral multiple between the resolution of the target high-resolution video image and the resolution of the intermediate high-resolution video image; and performing super-resolution processing based on interpolation by the non-integral multiple times on the intermediate high-resolution video image, to obtain the target high-resolution video image.

19. The apparatus according to claim 18, wherein, after obtaining the intermediate high-resolution video image, the processor is programmed to:

determine whether the resolution of the intermediate high-resolution video image is the same as the resolution of the target high-resolution video image; and when the resolution of the intermediate high-resolution video image is the same as the resolution of the target high-resolution video image, use the intermediate high-resolution video image as the target high-resolution video image.

20. The apparatus according to claim 18, wherein after using the intermediate high-resolution video image as the target high-resolution video image, the processor is programmed to:

extract a high-resolution video image of edge information; and obtain an enhanced target high-resolution video image by adding the high-resolution video image of the edge information, after performing gain control thereon, to the intermediate high-resolution video image.

* * * * *